United States Patent Office

2,960,467
Patented Nov. 15, 1960

1

2,960,467

AGGLOMERATED INORGANIC GELLING AGENTS FOR OLEAGINOUS VEHICLES

Thomas W. Martinek, Crystal Lake, Elmer W. Brennan, Carpentersville, and Ernest T. Fronczak, Crystal Lake, Ill., assignors to The Pure Oil Company, Chicago, Ill., a corporation of Ohio No Drawing. Filed Dec. 16, 1955, Ser. No. 553,427

12 Claims. (Cl. 252—28)

This invention relates to a process for agglomerating finely divided material. A more specific aspect of the invention is directed to a method for agglomerating finely divided siliceous material to produce pellets which may be easily dispersed in an oleaginous vehicle.

Because of the high performance requirements of modern machinery, considerable attention is being directed to the formation of lubricating greases or grease-like compositions, which are solid or semisolid lubricants, to meet the specialized requirements of lubrication applications where oil films cannot be maintained because of pressure or temperature. In services where machines are operated exposed to water, oxidation conditions, or high temperature, greases prepared by incorporating various soaps in an oleaginous vehicle have shortcomings. Used as replacements for these soap, lubricating grease-forming, thickening agents are various inorganic gelling agents, such as silica aerogels and specially treated clays. The non-soap lubricating grease-forming agents which are incorporated into the oleaginous liquid are very finely divided, having particle sizes of 5–100 millimicrons. The surface areas of these materials depend upon the type and method of preparation and will vary between about 100–1000 square meters per gram. These materials are to be distinguished from those inorganic compounds, such as finely-divided carbon, metal powders or flakes, or other similar substances, which add bulk to the grease but do not assist in the formation of its gel structure. In their pulverulent form, the non-soap grease-forming agents' lightness and fluffiness make shipping and storage costly, and handling difficult. To overcome these problems resulting from their low apparent density, it is obvious that conversion into small diameter aggregates would increase the bulk density, thereby cutting down on shipping and storage costs and reducing the amount of dust at the points of use. Several manufacturers have attempted to market their inorganic grease-forming agents in aggregate form. To produce these agglomerates, the gelling agents in paste form were charged to an extrusion process and formed into small diameter pellets whose random length depended upon the inherent lack of tensile strength in the extruded particles, or the disposition of whirling knives brought into contact with the extruded particles. While the production of gelling agents in pellet form improved the bulk handling of these finely divided materials, the pellets produced were difficult to disperse in the lubricating oil employed in the preparation of greases thickened with these inorganic gelling agents.

Accordingly, it is an object of this invention to increase the bulk density of finely-divided, inorganic gelling agents for oleaginous vehicles by agglomerating the smaller particles into larger masses. It is a further object of this invention to improve the efficiency of dispersion of pelleted masses of finely-divided, inorganic gelling agents for oleaginous vehicles. An additional object of the present invention is to provide readily dispersible pellets of inorganic gelling agents for use in the preparation of lubricating grease compositions. These and other objects will become apparent from the following detailed description of the instant invention.

According to the instant invention, an inorganic, non-soap, gelling agent for oleaginous vehicles may be prepared in a readily frangible, aggregate form by coating the finely-divided particles with an oleaginous liquid which functions as a primary binder-dispersant. The oil-coated mass is then charged to a suitable agglomerating process for the production of small diameter pellets of suitable length. As an illustrative but non-limiting example of the instant invention, 100 grams of a fluidized mass of Santocel ARD, a silica aerogel, such as that described by Kistler in U.S. Patent 2,260,625, and marketed by the Monsanto Chemical Company, was coated with approximately 10% by weight of a Mid-Continent, solvent refined, 85 viscosity, neutral lubricating mineral oil, by spraying the oil into the fluidized system. By processing the oil-treated silica aerogel in a conventional tableting machine, such as that employed in the preparation of pelleted catalysts, the apparent volume of the treated silica was reduced to approximately one-third of its original volume, and the crushing strength was less than 1 pound, as determined by a flat-contact friability test. One part by weight of the pellets, which were one-fourth inch in diameter, was incorporated into 9 parts by weight of a Mid-Continent, solvent refined, 160 viscosity, bright stock mineral lubricating oil, and a NLGI #2 grease was prepared by conventional grease processing techniques by premixing in conventional grease kettle and shearing in a Charlotte colloid mill. The pellets readily disintegrated during the normal grease processing to produce a grease composition having a smooth consistency and free from any siliceous agglomerates.

In addition to mineral lubricating oils, other oleaginous liquids may be employed as the primary binder and dispersant aid for agglomerating the inorganic, non-soap, gelling agents in accordance with this invention. For example, 100 grams of siliceous gelling agent, marketed by E. I. du Pont and Company, under the mark "PL–171," and described in U.S. Patent 2,657,149, was wetted with 10% by weight of Ucon LB–550, an oleaginous mono-ether derivative of a polyoxypropylene glycol, marketed by Carbide and Carbon Chemical Company, by conventional mixing. The physical characteristics of this composition are summarized in SAE Journal, 54, 228, 1946. The wetted agent was reduced to about one-third its original volume by compressing the powdered agent into soft, one-fourth inch pellets in a conventional tableting machine. The tablets formed in this manner were readily breakable and easily dispersed in a mineral lubricating oil base to provide a grease having the following composition:

| Component: | Weight percent |
|---|---|
| Mid-Continent solvent refined bright stock having a viscosity of 160 SUS at 210° F. and a viscosity index of 90 | 67.5 |
| Phenol extract of a bright stock lubricating oil fraction [1] | 22.5 |
| Ucon LB–550-treated Estersil, treated as above | 10.0 |

[1] A mineral lubricating oil fraction obtained as an extract from the phenol extraction of a dewaxed and deasphalted Mid-Continent residuum and having the following characteristics:

| | |
|---|---|
| API gravity | 14.6 |
| Viscosity, SUS— | |
| At 100° F | 19,500 |
| At 210° F | 313 |
| Viscosity index | +27 |
| Pour point, ° F | 90 |
| Carbon residue percent | 4.7 |

The shear and heat stability are illustrated by the following test results obtained in accordance with the provisions of the Standard Method of Test for Cone Penetration of Lubricating Greases, ASTM Designation D217–48.

| Strokes: | Penetration |
|---|---|
| 0 | 281 |
| 60 | 288 |
| 1600 | 296 |
| 5000 | 304 |
| Heated to 300° F. and cooled to 77° F. | 279 |

This grease also had excellent water resistance.

The oleaginous binder-dispersant which is employed in carrying out the agglomeration process of this invention includes conventional mineral lubricating oils, synthetic lubricating oils prepared by cracking and polymerizing products of the Fischer-Tropsch process, polymerized olefins, or other suitable lubricating, oil-soluble, oleaginous substances, such as organic phosphates, silicones, diesters of dicarboxylic acids, polyethylene glycols of suitable molecular weight, etc. Specific examples of such materials are comprehensively discussed in the prior art. For example, see Symposium, Synthetic Lubricating Oils, Ind. & Eng. Chem., 42, pages 2414–2467, 1950. Also included are liquid fatty oils, e.g., suitable binder-dispersants are provided by sperm oil, naturally-occurring liquid glyceryl esters of fatty acids of animal or vegetable origin, such as linseed oil, soybean oil, lard oil, etc., and oleaginous derivatives thereof. Examples of suitable derivatives include liquid fatty acids, e.g., oleic; liquid, oleaginous, substituted-ammonia compounds, including hexyl-, octyl-, or decylamine or mixtures thereof; and oil-soluble diamines, e.g., Duomeen T Dioleate, a dioleic acid salt of a fatty amine, marketed by Armour and Company. If desired, mixtures of these various oleaginous binder-dispersants may be employed. The amount of oleaginous binder-dispersant aid employed is about 5–20% by weight, based on the amount of inorganic gelling agent. The preferred amount is in the range of 8–12% by weight.

The solid inorganic agents which may be employed in the formation of small diameter pellets include low bulk density, solid, amorphous gelling agents, such as silicates, oxides, hydroxides, synthetic zeolites, mixed silicate-silica gels, and mixed silicate-hydroxide gels, silicon compositions prepared by the pyrolyzing of $SiCl_4$, tetraethyl silicate or a chlorosilane, as well as complex mixtures of these various types. The invention is also directed to the pelleting of crystalline agents, which also function as gelling agents for oleaginous vehicles, such as hydrophobic, oleophilic, natural and synthetic clays of the montmorillonite type, such as the bentones. Specific examples of suitable gelling agents include silica aerogel, or other gelatinous oxides of aluminum, tin, and thorium; the hydroxides of silicon, aluminum, calcium, chromium, vanadium, copper, lead, etc.; as well as the alkaline earth metal carbonates, polyvalent metal sulfides, and magnesium and aluminum silicates (synthetic zeolites). These and other suitable materials are comprehensively considered by the prior art. For example, see U.S. Patents 2,260,645; 2,583,623; 2,583,684; 2,554,222; 2,954,822; 2,629,691; and others.

It has also been found, according to this invention, that the addition of a secondary dispersant will further facilitate the incorporation of the inorganic gelling agent into an oleaginous vehicle. The secondary dispersants which are used in this invention are oil-soluble, non-oleaginous, organic polar compounds, such as high-molecular weight, oil-soluble organic acids, amines, esters, nitriles, ketones, derivatives or mixtures thereof. A collateral feature of this aspect of the invention is the rust-inhibiting properties which can be imparted to the finished composition by substances of this nature. Exemplary of the compounds which can be used in this manner include, but are not limited to, stearic acid, naphthenic acids, tetrahydroabietic acid, octadecylamine, cyclohexylamine, zinc laurate, magnesium stearate, ethyl stearate, octadecyl laurate, mono-, or di-lauryl maleate, aluminum naphthenate, octadecyl cyanide, methyl ethyl ketone, benzophenone, condensation product of chlorinated hydroxy organic acids and alkali metal mercaptides, e.g., mercaptoacetic acid, etc.

In incorporating the secondary dispersant in the pelleted inorganic gelling agent, it is preferably admixed with the primary oleaginous binder-dispersant and the gelling agent coated with the resulting solution. Amounts in the range of 0.001–2% by weight, based on the primary dispersant, will provide the desired enhancement in dispersion of the pelleted inorganic gelling agent in the oleaginous vehicle; however, amounts outside this range can be employed. The secondary dispersant can also be separately applied to the inorganic gelling agent. In this instance, the gelling agent should be pretreated with the secondary dispersant prior to coating the gelling agent with the primary binder.

In applying the binder-dispersant, or a solution of the binder and the secondary dispersant, ordinary mixing techniques may be employed wherein the gelling agent and the oleaginous liquid or solution are brought into intimate contact to effect the coating of the inorganic gelling agent particles with the liquid. From an inspection of the oil-treated gelling agent, the oil-gelling agent composite appears substantially dry. Therefore, it may be postulated that the coating is monomolecular and may be adsorbed in the gelling agent structure. Satisfactory application of the oleaginous liquid can be effected by mechanical mixing with paddle mixers, etc., spraying the liquid into a fluidized mass of gelling agent, flow mixers, etc. For specific equipment, reference is made to Chemical Engineers' Handbook, Perry, 3rd ed., McGraw-Hill, at page 1202, et seq.

In reducing the bulk density of the oleaginous-liquid-treated, inorganic agent, any conventional agglomerating process wherein solids are compacted by pressure may be employed. These include tableting machines, roll-type briquetting machines, and molding presses. Pressures sufficient to provide tablets or pellets having a crushing strength of less thn about 10 pounds per square inch, preferably less than one pound per square inch, as determined by the conventional pellet-crushing techniques used in catalyst testing, are employed. This test consists of disposing a pellet between a pair of flat-surfaced jaws and applying, either directly or by means of a lever system, a force sufficient to disintegrate the pellet. Generally, compacting pressures of 50 to 200 pounds per square inch are required to produce aggregates having this characteristic; however, depending upon the gelling agent being compacted, pressures outside this range can be employed. Pellets or tablets one-fourth to three fourths inch in diameter and one-fourth to three-fourths inch in length can be prepared in accordance with this invention to effect a volume reduction of one-third to one-eighth of the untreated gelling agent in bulk pulverulent form.

The preparation of lubricating greases using the pelleted gelling agents of this invention is carried out according to the conventional techniques described in Manufacture and Application of Lubricating Greases, Boner, Reinhold, 1954, at page 223, et seq.

Although the specific examples of this invention have been directed to the manufacture of lubricating greases, it is to be understood that the subject invention has application in the formulation of other products wherein finely-divided, inorganic agents are incorporated in oleaginous vehicles; for example, in the manufacture of various paint products wherein finely-divided silica is included in the paint formula, such as non-sag paints, non-gloss enamels, preparation of non-skid floor polishes, formulation of pigmented metal drawing compounds, etc.

It is therefore seen that the instant invention is directed to the agglomeration of finely-divided, inorganic agents

We claim as our invention:

1. A process for increasing the bulk density of pulverulent insoluble inorganic grease-thickening gelling agents which comprises intimately contacting a quantity of said gelling agent with an amount of a normally liquid binder-dispersant, consisting essentially of an oleaginous lubricating liquid selected from the group consisting of mineral lubricating oils, fatty oils, oleaginous hydrocarbons, organic phosphates, silicones, diesters of dicarboxylic acids, and polyethylene glycols, just sufficient to coat said gelling agent particle surfaces, compacting a portion of the liquid coated gelling agent in a confined cavity under sufficient pressure to produce a small diameter readily frangible aggregate having a crushing strength less than about 10 pounds per square inch and having enhanced dispersion action.

2. A process in accordance with claim 1 in which 5–30% by weight, based on the gelling agent, of oleaginous lubricating liquid is employed.

3. A process in accordance with claim 1 in which a pressure of 50 to 200 p.s.i. is employed.

4. A process in accordance with claim 1 in which a siliceous gelling agent is employed.

5. A process in accordance with claim 1 in which said oleaginous lubricating liquid contains a minor proportion of an oil-soluble organic polar compound-dispersant for the gelling agent.

6. A process in accordance with claim 5 in which the oleaginous lubricating liquid is added in an amount of 5–30% by wt. of said gelling agent and contains 0.001 to 2% by wt. of said oil-soluble organic polar compound-dispersant based on said oleaginous lubricating liquid.

7. A process in accordance in claim 6 in which a siliceous gelling agent is employed.

8. A process for manufacturing a pelletized, siliceous gelling agent readily dispersible in a liquid oleaginous vehicle which comprises intimately contacting 100 parts by weight of a pulverulent siliceous gelling agent with 10–30 parts by weight of a lubricating oil binder-dispersant just sufficient to effect the coating of the gelling agent surfaces with said oil, introducing a portion of the oil-coated gelling agent into a confined cavity having a diameter of one-fourth to three-fourths inch, compacting the portion of oil-coated gelling agent with sufficient pressure to reduce the bulk density of gelling agent portion to less than one-third its orignal volume, said pressure not being in excess of that required to produce an aggregate mass having a crushing strength of less than about 10 pounds per square inch.

9. A process in accordance with claim 8 in which 0.001–2% by weight based on said oil, of an oil-soluble, organic polar compound dispersant for said siliceous gelling agent is admixed with said lubricating oil.

10. A readily dispersible aggregate of an inorganic gelling agent for oleaginous lubricating liquids produced in accordance with claim 1.

11. A readily dispersible aggregate of an inorganic gelling agent for oleaginous lubricating liquids produced in accordance with claim 2.

12. A readily dispersible aggregate of an inorganic gelling agent for oleaginous lubricating liquids produced in accordance with claim 6.

References Cited in the file of this patent

UNITED STATES PATENTS

| | | |
|---|---|---|
| 2,358,202 | Behrman | Sept. 12, 1944 |
| 2,662,056 | McCarthy | Dec. 8, 1953 |
| 2,694,049 | Reynolds et al. | Nov. 9, 1954 |
| 2,705,700 | Iler et al. | Apr. 5, 1955 |
| 2,731,326 | Alexander | Jan. 17, 1956 |
| 2,758,085 | Oberright | Aug. 8, 1956 |
| 2,833,665 | Drexel | May 6, 1958 |

---

UNITED STATES PATENT OFFICE

CERTIFICATION OF CORRECTION

Patent No. 2,960,467                      November 15, 1960

Thomas W. Martinek et al.

It is hereby certified that error appears in the above numbered patent requiring correction and that the said Letters Patent should read as corrected below.

Column 3, line 37, for "5-20%" read -- 5-30% --; line 60, for the patent number "2,583,623" read -- 2,583,683 --; column 4, line 42, for "thn" read -- than --.

Signed and sealed this 25th day of April 1961.

(SEAL)
Attest:

ERNEST W. SWIDER                                    DAVID L. LADD

UNITED STATES PATENT OFFICE

CERTIFICATION OF CORRECTION

Patent No. 2,960,467                     November 15, 1960

Thomas W. Martinek et al.

It is hereby certified that error appears in the above numbered patent requiring correction and that the said Letters Patent should read as corrected below.

Column 3, line 37, for "5-20%" read -- 5-30% --; line 60, for the patent number "2,583,623" read -- 2,583,683 --; column 4, line 42, for "thn" read -- than --.

Signed and sealed this 25th day of April 1961.

(SEAL)

Attest:
ERNEST W. SWIDER
Attesting Officer

DAVID L. LADD
Commissioner of Patents